June 29, 1948.  C. W. HEWLETT  2,444,255
FABRICATION OF RECTIFIER CELLS
Filed Nov. 10, 1944
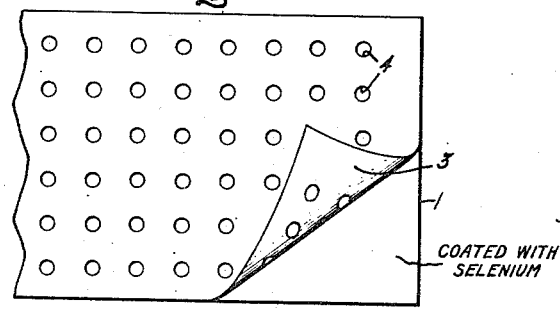
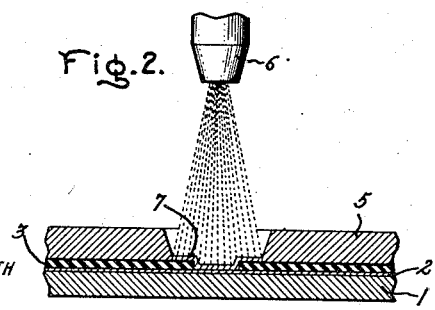
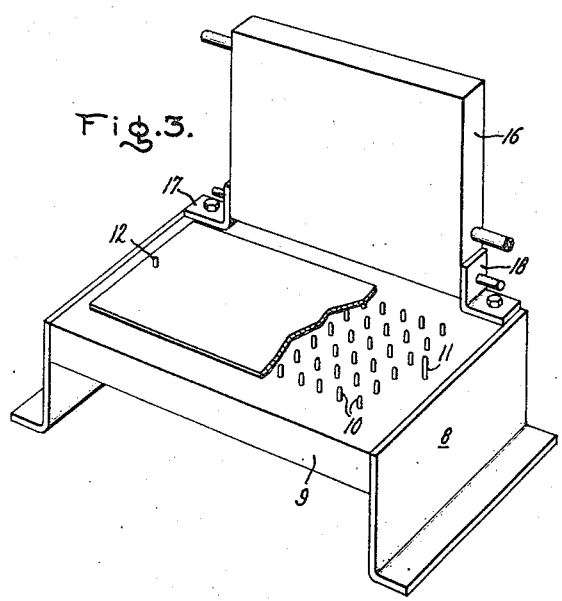
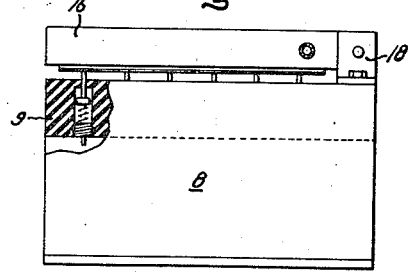
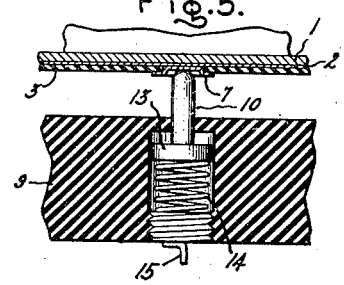
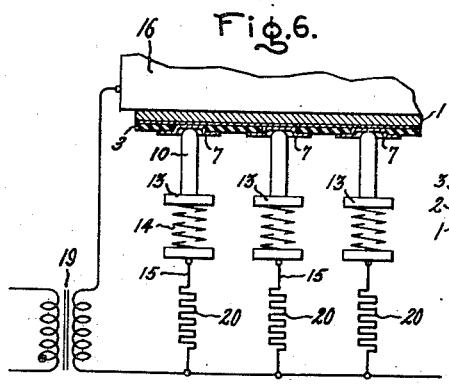
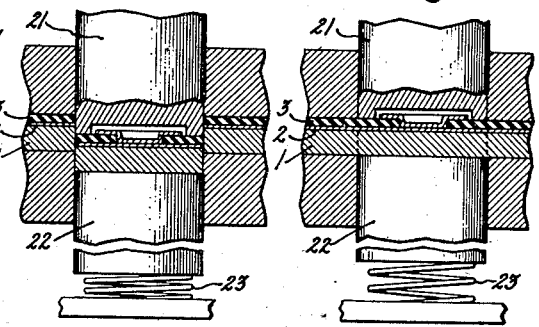
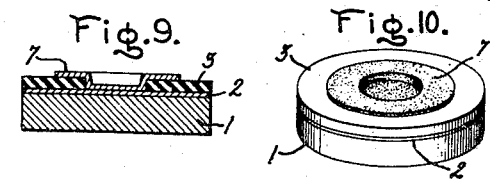
Inventor:
Clarence W. Hewlett,
by Harry E. Dunham
His Attorney.

Patented June 29, 1948

2,444,255

UNITED STATES PATENT OFFICE 2,444,255

FABRICATION OF RECTIFIER CELLS

Clarence W. Hewlett, Marblehead, Mass., assignor to General Electric Company, a corporation of New York Application November 10, 1944, Serial No. 562,860

4 Claims. (Cl. 175—366)

1

The present invention relates to metallic rectifiers, which are known also as dry plate rectifiers.

It is an object of my invention to provide rectifiers of improved characteristics and also to provide an improved fabrication method.

My invention will be described in connection with the manufacture of selenium rectifiers, but it should be understood that it is also applicable to the manufacture of other forms of dry plate rectifiers, in which, in place of selenium, other rectifying agents may be used, as for example tellurium or copper sulphide.

Selenium rectifiers, as well known, include a conductive base on which is deposited a stratum of selenium. A so-called blocking layer possessing rectifying characteristics is produced on the selenium by appropriate chemical treatment, for example, by treatment with hydrogen peroxide. Electrical connection to the blocking layer is made by a counter-electrode of metal which commonly is spray-deposited on the selenium film. The details of fabrication of an improved form of such rectifying units or cells is described in Hewlett U. S. Patent 2,334,554 of November 16, 1943.

It has been suggested to expedite the fabrication of such cells by depositing selenium on a parent plate of sufficient size to provide by subdivision a large number of cells. While some advantage in mass manufacture is realized by this expedient alone, practical difficulties have been encountered. The completed cells still required individual "forming" treatment before they were ready for service.

In accordance with the present invention, improved multiple fabrication of dry plate rectifiers by subdivision of a selenium-coated parent plate is carried out by a method involving the attachment to the parent plate of a sheet of insulating material containing a plurality of openings. This insulating sheet or mask, which is mounted upon the selenium layer before a blocking layer has been produced thereon, has the following functions:

It delimits the effective area of the active selenium surface whereby the current characteristic of a rectifier cell is determined for a chosen application.

It electrically insulates individual units from one another and thereby makes possible the complete fabrication and treatment of the units before being separated, including the electrical forming step.

The portion of insulating layer which remains in the completed unit eliminates possibility of

2 electrical short circuits by metallic burrs which may be raised at the edges of the elements in punching or cutting of each completed unit from the parent plate. The insulating layer when of sufficient thickness so spaces the conductive base (which is one electrode), from the opposite electrode that the presence of unavoidable small burrs does not result in the electrical short-circuits which otherwise might occur.

As a further consequence of my invention, improved rectifying cells may be produced at less cost than heretofore possible by conventional fabrication methods.

My invention will be described with greater particularity in connection with the accompanying drawings. Fig. 1 shows a selenium-coated parent plate having mounted therein a perforated insulating sheet; Fig. 2 is a cross section of a part of the parent plate together with a spray nozzle and spray shield; Fig. 3 is a perspective view of a multiple forming apparatus; Figs. 4 and 5 are sectional views of the forming structure; Fig. 6 illustrates circuit connections for the forming mechanism; Figs. 7 and 8 illustrate partly in section a punching mechanism for severing the rectifier units from the parent plate; Fig. 9 is an enlarged vertical section of a rectifier cell, and Fig. 10 is an enlarged perspective view of a rectifier cell.

In the batch fabrication of a group of rectifier cells a plate of suitable metal, preferably aluminum, is prepared by conventional and well understood methods whereby the surface first is cleaned, then roughened and next provided by condensation of vapor with a thin coating of a contact-improving metal, such as bismuth, tin or antimony, preparatory to depositing selenium or other semi-conductor metal. These initial steps form no part of my present invention. They are described in my above-mentioned prior Patent 2,334,554.

As further described in this patent selenium is deposited in two stages by evaporation and is heat treated. The presence of the selenium on the plate 1 is indicated on an exposed part in Fig. 1 and is shown in Figs. 2 and 3 as a layer 2 (the very thin coating of bismuth, or the like, not being shown).

On the selenium-coated surface is cemented a sheet 3 of insulating material which may consist of kraft cardboard about 5 mils in thickness. This sheet is coated on one side with a suitable thermoplastic material which functions as a cement. Polystyrene is suitable and may be applied as a coating (not shown) about 2 mils in thickness. The sheet 3, which constitutes a mask, is provided with a plurality of openings, or perforations, 4, the size of which determines the effective rectifying surface of the rectifier cells to be fabricated. The number of openings on a single sheet may be very large. The perforated paper mask 3 is subjected at an elevated temperature to pressing in contact with the plate 1 so as to become firmly attached to the plate 1.

The areas of selenium exposed by the perforations 4 in the mask 3 next are subjected to chemical treatment to develop blocking layers thereon. For example, the exposed selenium surfaces may be subjected to a hydrogen peroxide spray as described in my prior Patent 2,349,622 of May 23, 1944. The application of the blocking layer at this point is preferred to the treatment of the entire plate before the paper mask is applied as thereby the effectiveness of the blocking layer is preserved.

Counter electrode metal may be applied by spray deposition as the next step as indicated in Fig. 2. A shield 5 which may consist of chromium coated steel, or other suitable metal, is placed upon the paper mask 3. Openings in the shield 5 expose not only the perforations 4 but also a surrounding marginal area of the paper mask 3. By a suitable metal spray device, the nozzle 6 of which is indicated in the drawing, a layer 7 of soft solder-like metal, as, for example, an alloy of bismuth-cadmium-tin, is deposited immediately on the exposed surfaces. As best shown in Fig. 9, the counterelectrode 9 should not only cover the exposed surface of the selenium but should extend up the sides of the perforation and over a marginal strip of the paper. A width of $\frac{1}{32}''$ or more is satisfactory but in some cases the counterelectrode may extend to the edge of the layer, as shown in Fig. 2.

The shield 5 is removed upon completion of the spray step. The plate 1 is placed upon a multiple electrode fixture 8, which is shown in Fig. 3, for simultaneously electrically "forming" the selenium cells which have a common base constituted by the plate 1, the counterelectrodes being electrically insulated from one another. The base plate 9 of the fixture 8 consists of a suitable non-conducting material in which a plurality of electrodes are movably operable in slots as shown in Figs. 4 and 5. The plate 1 is provided with holes which when registering with pins 11, 12 of the fixture 8 properly align the counterelectrodes of the rectifier cells with respect to the corresponding electrodes 10—10. When properly aligned the counterelectrodes make electrical contact, as shown in Fig. 5, with the electrodes 10. Fig. 5 shows the electrodes 10 to be mounted by a base 13 on springs 14 to which a conductor 15 is electrically connected. A water-cooled cover plate 16 is supported on the hinges 17, 18 to be movable to a horizontal position in which, as shown in Fig. 4, the plate 16 presses the plate 1, thereby urging the multiple cells against the springs 14 of the electrodes 10.

Any suitable forming method may be used. As shown in Fig. 6 one terminal of the secondary winding of a transformer 19 is connected to the pressure plate 16. The multiple contacts 10 are connected in series with individual resistance 20 to the opposite terminal of the transformer winding. In this way suitable forming currents are simultaneously applied to each cell. Forming advantageously is continued for a period of about 30 minutes. With an applied voltage, of say 52 volts, and resistances of about 2000 ohms in circuit with each cell, the rectified current of all the cells in a plate which may be assumed to comprise 188 cells may be about 1.5 to 1.8 amperes initially and may be about 1.8 to 2.1 amperes finally.

The formed cells are punched from the parent plate by a die such as shown, for example, in Figs. 7 and 8. As there shown, the upper punching member 21 having a recessed face, to receive the slightly raised counterelectrode, reciprocates against a lower backing member 22 which is urged upwardly by a spring 23. By the co-action of these two parts the cells are punched from the parent plate. Preferably the cut cells are not entirely disengaged from the parent plate 1.

When the cells are cut from the parent plate both the elements 21 and 22 move upward until the cells are reset in the parent plate as shown in Fig. 8. The compound die consisting of the punching members 21, 22 supports on both sides the elements being punched so that the shearing process does not buckle the punched-out elements, or cells during the punching operation.

It is not essential that the various operations should be carried out exactly in the order stated above. For example, the punching operation, whereby the rectifier cells are severed from the parent plate, may follow the operation whereby the paper, or other insulating material, has been applied to the foundation plate. The punched out elements are set back into the parent plate as described above and subsequently a blocking layer is applied to the selenium. The counter-electrode is sprayed upon the treated surfaces. Thereupon the electro-forming step is carried out. Lastly the rectifier cells are disengaged from the parent plate. Similarly the rectifier cells may be punched from the parent plate after the counterelectrodes have been applied and set back into the parent plate, whereupon the electrical forming step may be carried out as above described.

In any event, regardless of the order in which the various fabrication steps are carried out with a consequent saving of time and fabrication cost, the completed cells, one of which is shown in Fig. 10, are finally carefully removed from the parent plate and are individually tested to determine their fitness for service.

What I claim as new and desire to secure by Letters Patent of the United States is:

1. The method of making rectifier cells which consists in applying selenium to a parent plate, uniting with said plate a layer of insulation containing openings of predetermined size, producing a blocking layer upon the areas of selenium exposed by said openings, spray-depositing counterelectrodes to said areas while shielding adjacent portions of said insulation, forming the cells thus constituted by individual and simultaneous application of current and severing the completed cells from said parent plate.

2. The method of fabricating simultaneously a plurality of dry plate rectifier units which consists in cementing an insulating sheet upon the surface of a metal parent sheet which is coated with selenium which is susceptible of having rectifying properties imparted thereto, said insulating sheet being substantially coextensive with said coating and having a plurality of apertures through which said selenium is exposed, producing a current-blocking condition by oxidation of the areas of the selenium thus exposed, applying counterelectrodes upon said exposed areas, whereby a plurality of rectifying cells are produced the bases of which are an integral part of said parent sheet, individually electrically forming the resulting selenium cells in separate forming circuits while said cells are still united with said parent sheet, and finally subdividing said parent sheet into a plurality of rectifier units.

3. The method of simultaneously fabricating a plurality of individual selenium rectifier cells which consists in applying on a parent plate of extensive area which is provided with a selenium coating a mask of non-conducting material having a plurality of openings which expose said selenium coating, treating with hydrogen peroxide said exposed areas of selenium to produce a rectifying condition thereon, applying counterelectrodes at said openings, individually and simultaneously forming the rectifier cells thus produced by passage of current therethrough while constituting an integral part of such assembly and finally severing the completed cells from the parent plate.

4. The method of fabricating rectifier cells which consists in applying a coating of selenium to a base plate, mounting upon said plate a substantially coextensive sheet of insulating material which is provided with a plurality of restricted openings having areas equal to the effective rectifying areas desired in completed cells, subjecting to hydrogen peroxide the selenium surfaces exposed through said openings to produce current-blocking characteristics, spray-applying metal coatings to said treated surfaces, said metal coatings being caused to overlap the edges of said insulating sheet surrounding said openings while remaining clear of adjacent areas, individually subjecting to electrical forming current the selenium surfaces provided with metal coatings and finally severing from said plate and attached insulating sheet, resulting rectifier cells comprising both said metal-coated areas and surrounding marginal portions of insulation-covered parent plate which is uncoated with metal.

CLARENCE W. HEWLETT.

REFERENCES CITED

The following references are of record in the file of this patent:

UNITED STATES PATENTS

| Number | Name | Date |
| --- | --- | --- |
| 2,156,054 | Geisler et al. | Apr. 25, 1939 |
| 2,235,051 | Thompson | Mar. 18, 1941 |
| 2,244,664 | Addink | June 10, 1941 |
| 2,314,104 | Richards | Mar. 16, 1943 |
| 2,359,377 | Miller | Oct. 3, 1944 |
| 2,369,185 | Skinker | Feb. 13, 1945 |
| 2,392,744 | Kallmeyer | Jan. 8, 1946 |